(12) United States Patent
Jankowski et al.

(10) Patent No.: US 6,234,279 B1
(45) Date of Patent: May 22, 2001

(54) AUTOMATIC ADJUSTER FOR BRAKE PISTON

(75) Inventors: Richard B. Jankowski, South Bend; Chad N. Zigler, Mishawaka, both of IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/379,990

(22) Filed: Aug. 24, 1999

(51) Int. Cl.$^7$ ........................................ F16D 55/02
(52) U.S. Cl. .................. 188/71.8; 188/196 P; 192/111 A
(58) Field of Search .................. 188/188, 71.8, 188/196 P; 403/274; 192/111 A

(56) References Cited

U.S. PATENT DOCUMENTS

| | | | |
|---|---|---|---|
| 3,122,222 | * 2/1964 | Burnett et al. | 188/196 |
| 3,376,959 | * 4/1968 | Holcomb | 188/196 |
| 4,006,669 | * 2/1977 | Price | 92/13.1 |
| 4,192,407 | * 3/1980 | Crossman | 188/196 R |
| 4,288,172 | * 9/1981 | Livesay | 403/317 |
| 4,433,758 | * 2/1984 | Crossman | 188/196 |
| 4,449,616 | * 5/1984 | Musser | 188/71.8 |
| 4,503,950 | * 3/1985 | Anderson | 188/196 |
| 4,529,068 | * 7/1985 | Gallo | 188/71.8 |
| 4,751,985 | * 6/1988 | Chambers | 188/71.8 |
| 4,815,359 | * 3/1989 | Black | 92/13.1 |
| 5,154,262 | * 10/1992 | Berwanger | 188/196 R |
| 5,219,046 | * 6/1993 | Clark | 188/71.8 |
| 5,458,221 | * 10/1995 | Flux et al. | 188/374 |
| 5,810,409 | * 9/1998 | Hardie | 294/65.5 |
| 6,016,892 | * 1/2000 | Berwanger | 188/71.8 |

* cited by examiner

Primary Examiner—Douglas C. Butler
Assistant Examiner—Benjamin A. Pezzlo
(74) Attorney, Agent, or Firm—Larry J. Palguta

(57) ABSTRACT

An adjustment arrangement for a hydraulic brake actuator (11) of the type having a piston (17) which moves a preferred distance within a cylindrical bushing (15) portion of a housing between a quiescent retracted position with a preferred clearance space between one piston end and a brake mechanism, and an extended position with the piston end engaging and actuating the brake mechanism in response to the application of hydraulic fluid pressure includes a return spring (23) which, upon relief of the hydraulic pressure, urges the piston (17) back from the brake mechanism engaging position to the retracted position. There is an internally disposed mechanical piston clearance space adjustment feature including an expandable sleeve (33) which surrounds a cantilevered pin (37) having a split expander ring (35a, 35b) near a free end thereof. Upon excessive piston (17) travel, the sleeve moves along the expander ring (35a, 35b) to establish a new retracted piston position. Depression of the piston (17) to its initial position allows removal of the split ring (35a, 35b) and expandable sleeve (33) allowing ready substitution of a new sleeve during brake maintenance.

19 Claims, 3 Drawing Sheets

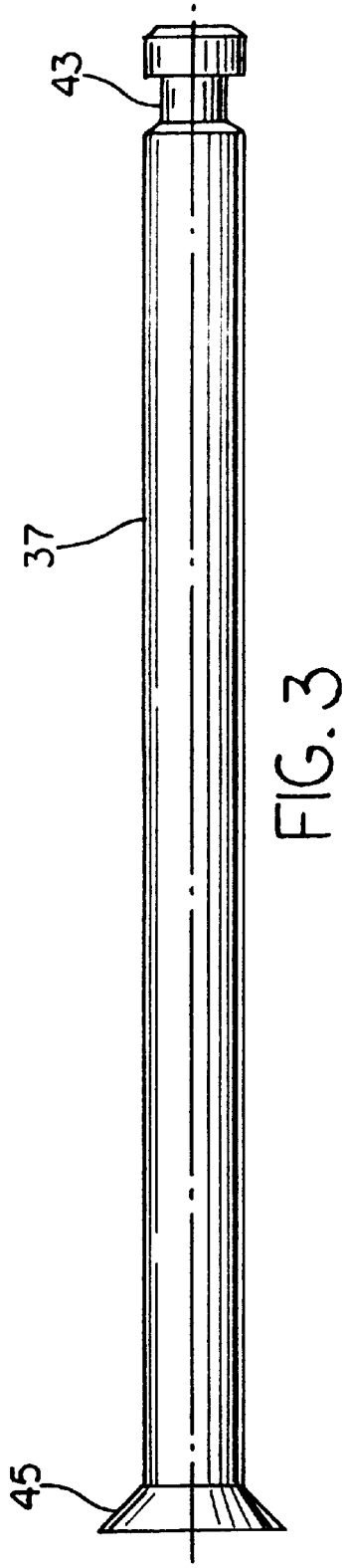
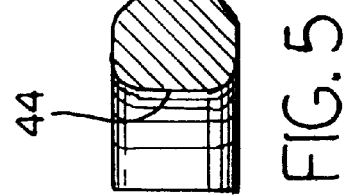
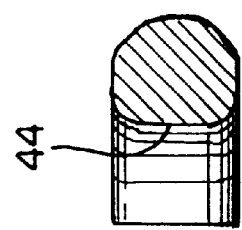

AUTOMATIC ADJUSTER FOR BRAKE PISTON

BRIEF SUMMARY OF THE INVENTION

The present invention relates generally to methods and apparatus for adjusting hydraulic brake pistons, for example, to compensate for brake friction surfaces wear, and more especially to an internal automatic adjuster for such brake pistons. The preferred embodiment of the present invention relates to an internally disposed mechanical brake piston adjuster assembly for an aircraft brake.

It is common knowledge that vehicle braking over a period of time causes wear of the brake pads or other friction surfaces resulting in increased clearance between the braking surfaces and requiring a longer stroke of the brake actuator piston to effect braking. At one time this problem was alleviated by periodic manual adjustment of the brake. Automatic adjustment schemes have largely eliminated the need for such periodic manual adjustments.

Many automatic brake piston adjustment arrangements are external to the brake actuator, however, in some applications this is undesirable, for example, due to space considerations. Another application where such external adjustment arrangements may be undesirable is multi-disk brakes employed, for example, on aircraft.

Internally disposed brake piston adjusters are also known and frequently employ an adjuster tube which may be periodically deformed radially outwardly (U.S. Pat. Nos. 4,751,985 and 5,154,262) or inwardly (copending Berwanger USSN 081905,246, assigned to the assignee of the present application and entitled Pinless Automatic Adjuster for Brake Piston now U.S. Pat. No. 6,016,892) to compensate for braking surface wear by re-establishing the rest or quiescent retracted position of the brake piston.

Briefly, in the U.S. Pat. No. 4,751,985 patented system, the brake piston adjuster mechanism includes a radially outwardly expandable or deformable adjuster tube which is attached to the brake piston and engaged by a fixed deforming member comprising a cantilevered adjuster pin having a threaded free end receiving thereon a nut and tube expander. As braking surfaces wear, the piston stroke during brake actuation increases and becomes sufficient to move the adjuster tube axially along the tube expander deforming the tube and establishing a new retracted or rest position for the piston. This system had excessive stress regions in the area of the pin threaded end. The U.S. Pat. No. 5,154,262 patented system alleviated the stress regions while retaining the deforming member structure of a pin having a threaded end receiving a nut and tube expander, with the nut biasing the tube expander against a chamfered pin shoulder. The tube expander had at least one inner diameter chamfer which engaged the chamfered pin shoulder in order to impose preload forces upon the chamfered pin shoulder and reduce stresses at a smaller diameter portion of the pin. The nut could be a castellated nut which received a locking wire or pin extending through an opening in the threaded end of the pin. Alternatively, the tube expander and nut could comprise a one-piece expander nut having an enlarged radially extending end portion and the nut, when advanced along the threads of the pin, caused a chamfer of the end portion to advance along the chamfered pin shoulder and caused the end portion to deform elastically, improving the preload retention of the connection. In some implementations of these patented systems, the adjuster pin fixed end was square so as to not rotate about its axis when the nut was unthreaded. While this arrangement allowed removal of the adjuster tube without the need for removing the entire brake bushing portion of the housing, the square end was also susceptible to high stress region failure. In other implementations, the fixed end was conical and not susceptible to such failures, however, the conical fixed end configuration, which was provided with an Allen wrench socket, required removal of the entire piston bushing from the remaining portion of the brake piston housing to gain access to the conical end to effect removal of the nut and replacement of the adjuster tube.

While these prior patented arrangements generally achieved their desired goals, some shortcomings remain. Elimination of the square fixed end stress regions required the undesirable removal of the brake piston bushing during maintenance and adjustment tube replacement. The threaded free end of the adjuster pin still experienced undesirably high stress regions near the base of the threads and where the castellated nut locking wire or cotter pin hole passed transversely through the pin. Due to the limited number (typically six) of discrete angular positions for the castellated nut, appropriate torquing of the nut was difficult and sometimes inaccurate. This torquing establishes the initial location and preload of the tube expander within the adjuster tube.

It is highly desirable to provide an easily serviced brake piston adjuster assembly which automatically adjusts the return position of the brake piston as the brake friction surfaces wear. It is also highly desirable to provide a brake piston adjuster assembly which eliminates the adjuster pin high stress points and possibility of fatigue induced failures. It is further highly desirable to provide a compact, economical internal adjustment arrangement for a brake piston which does not experience fatigue induced failures and which does not require excessive disassembly during maintenance.

The present invention provides solutions to the above problems by providing a brake piston adjuster assembly including a housing with a cylindrical bore and a relatively fixed return spring anchor location within the housing. A piston is disposed slidably in the housing bore and may be extended therefrom in response to the application of hydraulic pressure to one piston end. A helical piston return spring resides within the piston and has one end engaging the piston and another end engaging the relatively fixed anchor location. The spring compresses as the piston is extended from the housing and urges the piston further back into the housing upon the reduction of hydraulic pressure on the piston end. The anchor location of the return spring may be modified by radially expanding an adjuster tube to establish a new relatively fixed location within the housing in response to piston translation which exceeds a predetermined distance to change the location to which the spring returns the piston. This effectively restores a predetermined clearance spacing between the piston and a braking mechanism each time the piston stroke becomes excessive. Periodically, the adjuster tube requires replacement which is accomplished by compressing the spring and moving the adjuster tube thereby exposing a split ring tube expander for removal preparatory to removing the adjuster tube. The split ring tube expander normally resides in a complementarily contoured groove in a fixed cantilevered adjuster pin.

BRIEF DESCRIPTION OF THE DRAWING

FIG. 3 is a side elevation view of the adjuster pin of FIG. 1;

FIG. 4 is an end elevation view of one half of the split expander ring of FIG. 1; and FIG. 5 is a cross-sectional view along the lines 5—5 of FIG. 4.

Figure 1:
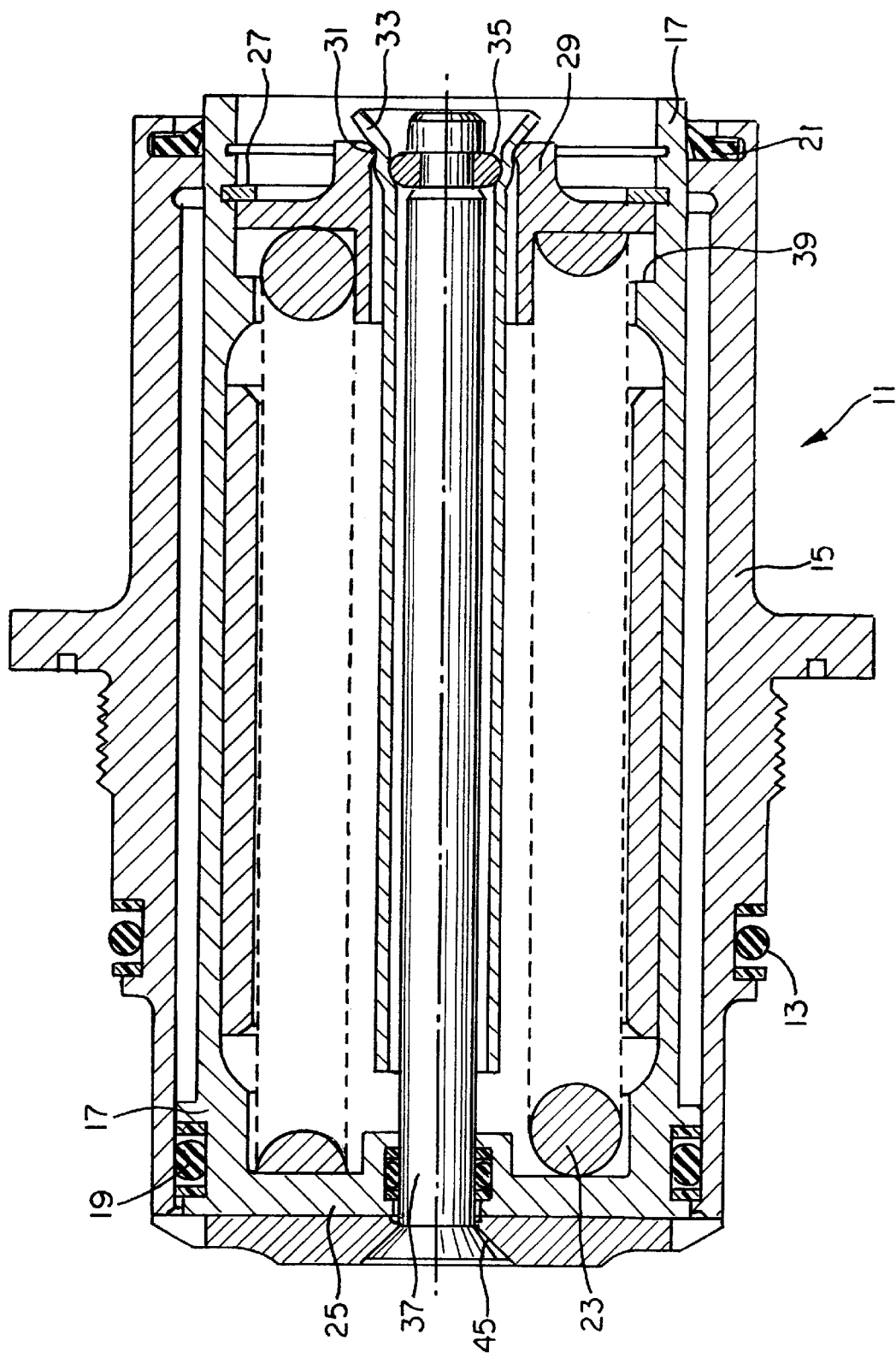
FIG. 1 is a cross-sectional view of a hydraulic brake actuator including a mechanical internal brake piston adjustment mechanism according to one form of the present invention.

It will be understood that, while cross-sectional views have been presented, most all the brake actuator components are solids of revolution about an axis and have cylindrical symmetry.

Corresponding reference characters indicate corresponding parts throughout the several views of the drawing.

DESCRIPTION OF THE PREFERRED EMBODIMENT

In FIG. 1, a brake actuator mechanism 11 which may be threadedly received in a housing and sealed therein by O-ring 13 includes a housing bushing 15, piston 17 with an O-ring seal 19 and an end seal 21. While not illustrated, the right end of piston 17 typically receives an end flange which selectively engages a pressure plate for compressing an interleaved stack of rotors and stators, one of a pair of caliper brake pads, or other braking configuration as is conventional. Within the piston 17, a helical spring 23 urges the spring retainer washer 29 into engagement with spring clip 27. Upon operator brake actuation, fluid acts on piston face 25 forcing the piston 17 rightwardly as viewed to apply the braking force. This rightward motion compresses spring 23, however, retainer washer 29, adjuster tube 33 and adjuster pin 37 normally remain in fixed locations. The adjuster pin 37 has a conically flared end 45 which rests in a conical seat in an end wall of the bushing 15. Except for friction, the adjuster pin is free to rotate about its axis in this conical seat while the mating conical surfaces provide cantilever support and hold the adjuster pin 37 in a fixed axial location.

Figure 2A:
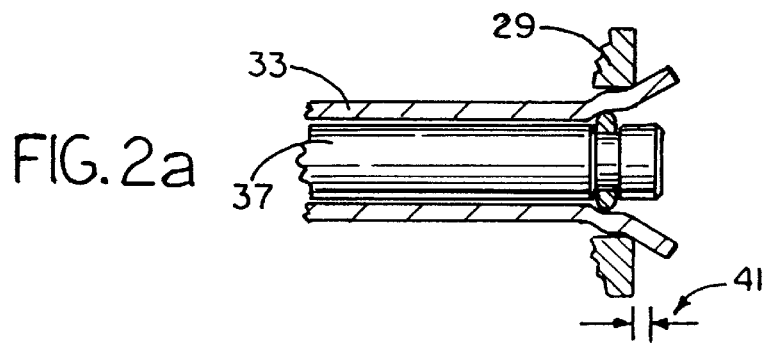
FIGS. 2a–2e are simplified views sequentially illustrating the operation of the brake actuator of FIG. 1 including adjustment incrementation and subsequent removal of the adjuster tube.
Figure 2B:
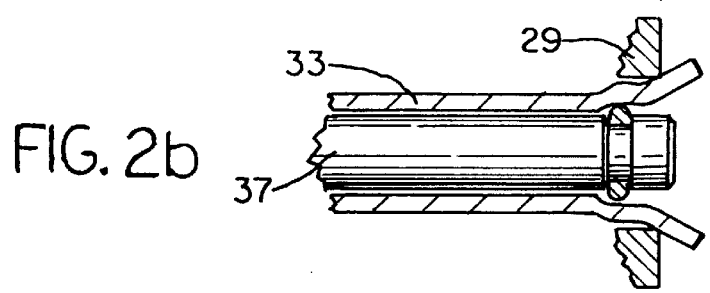

Normally, full braking force is achieved before the retainer washer 29 is engaged by the piston shoulder 39, hence, during normal braking, the adjuster tube 33, retainer washer 29 and adjuster pin 37 remain fixed as in FIG. 2a. However, if sufficient wear has occurred, the shoulder 39 engages the washer 29 causing adjuster tube 33 to be pulled rightwardly along expander ring 35 through the distance 41 thereby flaring the adjuster tube and establishing a new relative position between the adjuster tube 33 and adjuster pin 37 as in FIG. 2b. When the brake fluid pressure is relieved, the spring 23 returns the piston 17 leftwardly until the spring clip 27 again engages spring retainer washer 29. The frictional joint at 31 between the adjuster tube 33 and retainer washer 29 is unchanged. However, the retainer washer 29 and adjuster tube 33 are now at a new location along the expander ring 35 and the adjuster pin 37, hence, the rest position of the piston is now to the right of where it formerly was. Thus, if the piston 17 moves far enough to the right for the piston shoulder 39 engage the washer 29, the adjuster tube 33 is forced along the expander ring 35, establishing a new position for the tube 33 and washer 29, and adjusting the retracted position of the piston. This, in turn, results in incrementally reestablishing the preferred brake clearance spacing.

Figure 2C:
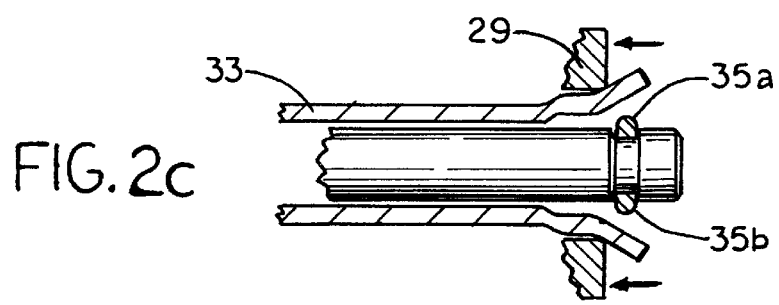

During operation, the adjuster tube 33 is radially expanded further and further down its length to compensate for the reduced thickness of the braking friction surfaces and, when the braking friction surfaces require replacement with new thicker surfaces, the adjuster tube 33 also needs to be replaced. Removal of the spent tube is accomplished as shown in FIGS. 2c, 2d and 2e.

Figure 2D:
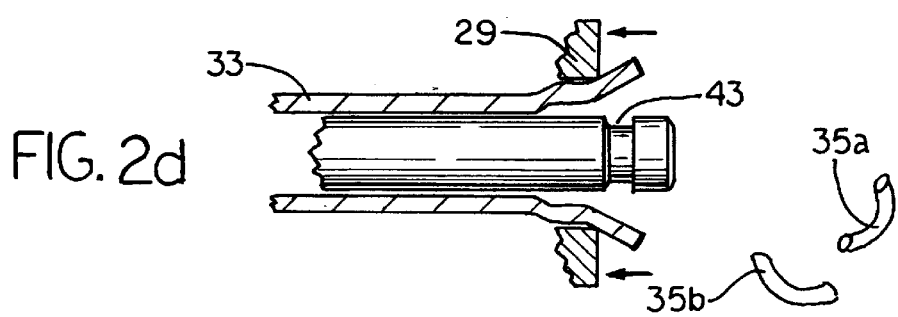
Figure 2E:
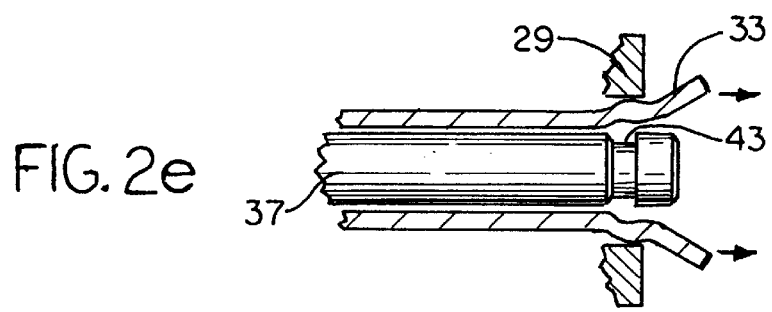

As best seen in FIGS. 2d, 4 and 5, the expander ring 35 actually comprises two halves 35a and 35b, and these two ring halves include a relatively flat shaped inner surface 44 which normally resides in a complementarily contoured groove 43 (FIGS. 2d, 2e and 3) near the free end of the adjuster pin 37. The expander ring 35 is held or captured in groove 43 by the deformable adjuster tube 33. To remove the tube 33, the spring retainer washer 29 is forced to the left as illustrated by the arrows in FIG. 2c, first compressing spring 23 and then, when the washer 29 engages piston shoulder 39, forcing fluid from the brake cylinder and returning the piston to its extreme left position as shown in FIG. 1. The adjuster tube 33 is carried leftwardly with the washer 29 exposing the ring halves 35a and 35b as shown in FIG. 2c. The halves 35a and 35b may fall free, as seen in FIG. 2d, or be removed from the groove 43 by a tool such as a magnet. Once the retainer halves are removed, the tube 33 may be pulled toward the right along the adjuster pin 37 as shown in FIG. 2e and removed from the brake assembly. A new tube 33 is then telescoped over the adjuster pin 37, the washer 29 again depressed to compress spring 23 and the retainer halves reinserted into groove 43. Release of the washer 29 holds the new adjuster tube 33 in the position of FIGS. 1 and 2a ready for use.

The present invention enables the elimination of the adjuster pin threads, castellated nut, lockwire, required torqueing, and stress risers at the pin due to holes in the pin and from the threads. The adjuster tube may be changed without using an adjuster pin having a square head at one end of the pin, and without removing the housing bushing. The initial preload of the expander ring is determined by its initial position along the adjuster pin and by tolerances. The installation time of a new expander tube is reduced from several minutes to less than one minute, as a result of not having to remove and reinstall a lockwire. In summary, the high stress regions associated with the two ends of the adjuster pin have been eliminated while retaining the ability to remove and insert adjuster tubes from the brake friction surfaces side of the brake piston. By holding close tolerances on the components, preloading of the adjuster components is improved over what was formerly achieved using the prior art castellated nut configuration, and the installation time for a new expander tube significantly reduced.

What is claimed is:

1. A hydraulic brake actuator of the type having a piston translatable a preferred distance within a cylindrical bore in a housing between a quiescent retracted position with a preferred clearance space between one piston end and a brake mechanism, and an extended position with said piston end engaging and actuating the brake mechanism in response to the application of hydraulic fluid pressure;

a return spring operable upon relief of the hydraulic pressure to urge the piston back from the extended position to the retracted position, and a mechanical piston clearance space adjustment arrangement disposed internally within the piston and comprising:

a cantilevered pin having an annular groove near a free end thereof and an opposite annular-shaped end captured at a piston bushing of the actuator;

a multiple part expander ring residing in the pin groove;

normally fixed anchor means for engaging and holding one end of the return spring during spring deformation and comprising a deformable sleeve telescopically surrounding the pin; and means for moving the anchor means to a new fixed location relative to the pin and expander ring in response to piston translation exceeding the preferred distance thereby changing the quiescent retracted position to which the return spring forces the piston and reestablishing the preferred clearance space, whereby the mechanical piston clearance space adjustment arrangement enables removal of the deformable sleeve from the actuator, without removing either the surrounding piston or piston bushing, by displacement of the piston and sleeve to a retracted position and removal of the expander ring from the groove.

2. The actuator of claim 1, wherein the anchor means further comprises a washer frictionally engaging the deformable sleeve.

3. The actuator of claim 1, wherein the expander ring comprises a pair of annulus halves held captive in the pin groove by the deformable sleeve.

4. The actuator of claim 1, wherein the halves each include a relatively flat shaped inner surface engaging a complementarily shaped surface of the pin groove.

5. A brake piston adjuster assembly comprising a housing having therein a cylindrical bore, a relatively fixed anchor location within the housing, a piston disposed slidably in the cylindrical bore to be extendable therefrom in response to the application of hydraulic pressure to one end thereof, a helical piston return spring disposed within the piston and having one end engaging the piston and another end engaging the relatively fixed anchor location within the housing, the spring adapted to compress as the piston is extended from the housing and to urge the piston further into the housing upon the reduction of hydraulic pressure on the piston one end, and means including a cantilevered adjuster pin having one annular-shaped end engaging the housing and a split ring expander near a free end thereof surrounded by a deformable sleeve for modifying the anchor location to a new relatively fixed location within the housing in response to piston translation exceeding a predetermined distance thereby changing the location to which the spring returns the piston, whereby when the return spring is compressed the split ring expander ring is removable so that the deformable sleeve can be removed without removal of the piston from the housing.

6. The brake piston adjuster assembly of claim 5, wherein the adjuster pin includes an annular groove near the free end for receiving the split ring expander.

7. The brake piston adjuster assembly of claim 6, wherein the split ring expander includes a relatively flat shaped inner surface engaging a complementarily shaped surface of the annular groove.

8. The brake piston adjuster assembly of claim 5, wherein the means for modifying the anchor location further includes the deformable sleeve telescopically surrounding the adjuster pin and split ring expander and a spring retaining washer engaging the sleeve, the sleeve and washer being movable axially along the pin and ring expander only upon piston translation exceeding the predetermined distance.

9. The process of replacing a radially outwardly deformable component of an internal automatic brake piston adjustment system without removing either a surrounding brake piston or piston bushing from a brake housing, the system including a pin having an annular-shaped end captured at the bushing and a free end with a groove, comprising the steps of:

compressing a brake piston return spring;

forcing the brake piston and deformable component to an initial fully retracted position;

removing a brake system component which is held within a groove of the pin solely by the deformable component, the system component engaging and for causing radial deformation of the deformable component; and axially sliding the deformable component from within the brake piston without removing either the piston or the piston bushing from the brake housing.

10. The process of claim 9, including the additional steps of axially sliding a new deformable component into the brake piston, replacing the brake system component which engages and causes radial deformation of the deformable component, and releasing the brake piston and brake piston return spring.

11. The process of claim 9, wherein the deformable component telescopically surrounds the pin which is a relatively fixed cantilevered pin having a free end for receiving the brake system component which engages and causes radial deformation of the deformable component.

12. The process of claim 9, wherein the step of removing comprises juxtaposing a permanently magnetized member with the brake system component and withdrawing said brake system component.

13. The process of claim 9, wherein the brake system component which engages and causes radial deformation of the deformable component comprises two halves of an annular ring.

14. A hydraulic brake actuator of the type having a piston translatable a preferred distance within a cylindrical bore in a housing between a quiescent retracted position with a preferred clearance space between one piston end and a brake mechanism, and an extended position with said piston end engaging and actuating the brake mechanism in response to the application of hydraulic fluid pressure;

a return spring operable upon relief of the hydraulic pressure to urge the piston back from the extended position to the retracted position, and a mechanical piston clearance space adjustment arrangement disposed internally within the piston comprising:

a cantilevered pin having an annular groove near a free end thereof, the pin having an opposite end engaging a bushing by means of an annular-shaped end, the pin rotatable relative to the bushing;

a multiple part expander ring located within the pin groove;

normally fixed anchor means for engaging and holding one end of the return spring during spring deformation and comprising a deformable sleeve telescopically surrounding the pin and being the sole means for retaining the expander ring within the pin groove; and means for moving the anchor means to a new fixed location relative to the pin and expander ring in response to piston translation exceeding the preferred distance thereby changing the quiescent retracted position to which the return spring forces the piston and reestablishing the preferred clearance space, whereby the ring, when the return spring is compressed, is removable so that the deformable sleeve is removed from the actuator without removal of the bushing from the housing.

15. The arrangement of claim 14, wherein the anchor means further comprises a washer frictionally engaging the deformable sleeve.

16. The actuator of claim 14, wherein the expander ring comprises a pair of annulus halves held captive in the pin groove by the deformable sleeve.

17. The actuator of claim 14, wherein the halves each include a relatively flat shaped inner surface engaging a complementarily shaped surface of the pin groove.

18. The actuator of claim 14, wherein the annular-shaped end is conically shaped to minimize stress risers thereat.

19. The actuator of claim 14, wherein the conically shaped end does not have an opening therein for a tool.

* * * * *